(12) United States Patent
Spry et al.

(10) Patent No.: US 7,461,140 B2
(45) Date of Patent: Dec. 2, 2008

(54) METHOD AND APPARATUS FOR IDENTIFYING IPSEC SECURITY POLICY IN ISCSI

(75) Inventors: Andrew J. Spry, Wichita, KS (US); James A. Lynn, Rose Hill, KS (US)

(73) Assignee: LSI Corporation, Milpitas, CA (US)

( * ) Notice: Subject to any disclaimer, the term of this patent is extended or adjusted under 35 U.S.C. 154(b) by 1096 days.

(21) Appl. No.: 10/741,563

(22) Filed: Dec. 19, 2003

(65) Prior Publication Data

US 2005/0149748 A1 Jul. 7, 2005

(51) Int. Cl.
*G06F 15/177* (2006.01)
*G06F 15/16* (2006.01)
*G06F 17/00* (2006.01)
*G06F 7/04* (2006.01)
*G06F 17/30* (2006.01)
*G06F 7/58* (2006.01)
*H04K 1/00* (2006.01)
*H01L 9/00* (2006.01)
*H01L 9/32* (2006.01)
*G06K 9/00* (2006.01)
*G06K 19/00* (2006.01)

(52) U.S. Cl. .................. 709/220; 709/227; 709/228; 709/245; 726/1; 726/2; 726/3; 726/4; 726/14

(58) Field of Classification Search ................. None
See application file for complete search history.

(56) References Cited

U.S. PATENT DOCUMENTS

| | | | |
|---|---|---|---|
| 6,009,535 A | 12/1999 | Halligan et al. | |
| 6,292,900 B1 * | 9/2001 | Ngo et al. | 726/6 |
| 6,732,289 B1 | 5/2004 | Talagala et al. | |
| 6,769,071 B1 | 7/2004 | Cheng et al. | |
| 7,055,056 B2 | 5/2006 | Bessire | |
| 2003/0084209 A1 * | 5/2003 | Chadalapaka | 710/5 |
| 2003/0115447 A1 * | 6/2003 | Pham et al. | 713/153 |
| 2003/0177174 A1 | 9/2003 | Allen et al. | |
| 2003/0229689 A1 | 12/2003 | Raghavan et al. | |
| 2004/0249973 A1 * | 12/2004 | Alkhatib et al. | 709/245 |
| 2005/0055572 A1 * | 3/2005 | Warwick et al. | 713/201 |
| 2005/0108531 A1 * | 5/2005 | Swander et al. | 713/171 |

(Continued)

OTHER PUBLICATIONS

Satran et al., "iSCSI", Jan. 2003, Internet Draft, pp. 1-225.*

(Continued)

*Primary Examiner*—John Follansbee
*Assistant Examiner*—Hassan Phillips
(74) *Attorney, Agent, or Firm*—Suiter Swantz PC LLO

(57) ABSTRACT

The present invention is directed to a method and apparatus for identifying IPsec security policy in iSCSI. In an exemplary aspect of the present invention, a method for identifying IPsec security policy in iSCSI includes the following steps. An IP address may be allocated to a physical port of an iSCSI network entity. The physical port may include at least one TCP listening port. For a discovery session, the IP address may be statically allocated (or permanently leased). For a normal session, the IP address may be statically allocated or DHCP assigned. A TCP listening port associated with the IP address in an iSCSI portal may then be used to link a security policy on an IP connection with iSCSI configuration.

19 Claims, 3 Drawing Sheets

U.S. PATENT DOCUMENTS

2005/0223279 A1    10/2005    Malpani et al.

OTHER PUBLICATIONS

Rob Elliot, Nov. 2, 2002, T10/02-419r0 SAM-3 SPC-3 SAS FCP-3 SRP-2 Device Identifiers and VPD data, pp. 1-2.
iSCSI Technical White Paper; www.ietf.org.
iSCSI Review; http://www.digit-life.com/articles2/iscsi/; Nov. 17, 2003.
iSCSI for Storage Networking; www.ietf.org.
iSCSI Building Blocks for IP Storage Networking; SNIA IP Storage Forum.
iSCSI Protocol Concepts and Implementation; Cisco Systems.

* cited by examiner

| TCP Listening Port | Portal Type | Security Level |
|---|---|---|
| 3260 | Discovery | Clear Text (No Security) |
| 50001 | Normal | Clear Text (No Security) |
| 50002 | Normal | Authentication Headers |
| 50003 | Normal | AES Encryption |
| 50004 | Normal | Custom Security Level 1 |
| 500nn, nn = 05 to 49 | Normal | Custom Security Level 2 to 45 |

METHOD AND APPARATUS FOR IDENTIFYING IPSEC SECURITY POLICY IN ISCSI

CROSS-REFERENCE TO RELATED DOCUMENTS

The present application herein incorporates the following U.S. patent applications by reference in their entirety:

| Attorney Docket Number | Express Mail Label Number | Filing Date |
| --- | --- | --- |
| LSI 03-1819 | EV 303 409 747 US | Dec. 19, 2003 |
| LSI 03-1820 | EV 303 409 755 US | Dec. 19, 2003 |

FIELD OF THE INVENTION

This invention relates generally to data storage systems, and particularly to a method and apparatus for identifying IPsec security policy in iSCSI.

BACKGROUND OF THE INVENTION

Internet Small Computer System Interface (iSCSI) is an SCSI transport protocol form mapping of block-orientated storage data over TCP/IP (Transmission Control Protocol/Internet Protocol) networks. iSCSI builds on two widely used technologies—SCSI commands for storage and IP protocols for networking. By carrying SCSI commands over IP networks, iSCSI is used to facilitate data transfers over intranets and to manage storage over long distances. The iSCSI protocol enables universal access to storage devices and storage area networks (SANs). These networks may be dedicated networks or may be shared with traditional Ethernet applications.

Conventionally, the security policy of each end of iSCSI secure connections need be defined with the knowledge of the IP address of the other end of the connection. This often makes configuration difficult. Additionally, the iSCSI standard has some restrictions on features such as limits on the length of CHAP (Challenge Handshake Authentication Protocol) secrets when authenticating on an unsecured connection, and the like. To allow smaller secrets, the iSCSI layer need have an interface to the IP layer to determine the security policy in effect on a connection.

Thus, it would be desirable to provide a method for allowing the security policy to be defined entirely on the target with target specific attributes, which eliminates the need for a chat interface between layers in the network protocol stack.

SUMMARY OF THE INVENTION

Accordingly, the present invention is directed to a method and apparatus for identifying IPsec security policy in iSCSI. In an exemplary aspect of the present invention, a method for identifying IPsec security policy in iSCSI includes the following steps. An IP address may be allocated to a physical port of an iSCSI network entity. The physical port may include at least one TCP listening port. For a discovery session, the IP address may be statically allocated (or permanently leased). For a normal session, the IP address may be statically allocated or DHCP assigned. A TCP listening port associated with the IP address in an iSCSI portal may then be used to link a security policy on an IP connection with iSCSI configuration.

In an additional aspect of the present invention, an iSCSI network entity may include at least one iSCSI controller. Each controller may include a plurality of physical ports, each physical port having an IP address and including at least one TCP listening port. Each TCP listening port may identify a security policy used on a connection opened on the TCP listening port.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figures 1, 4:
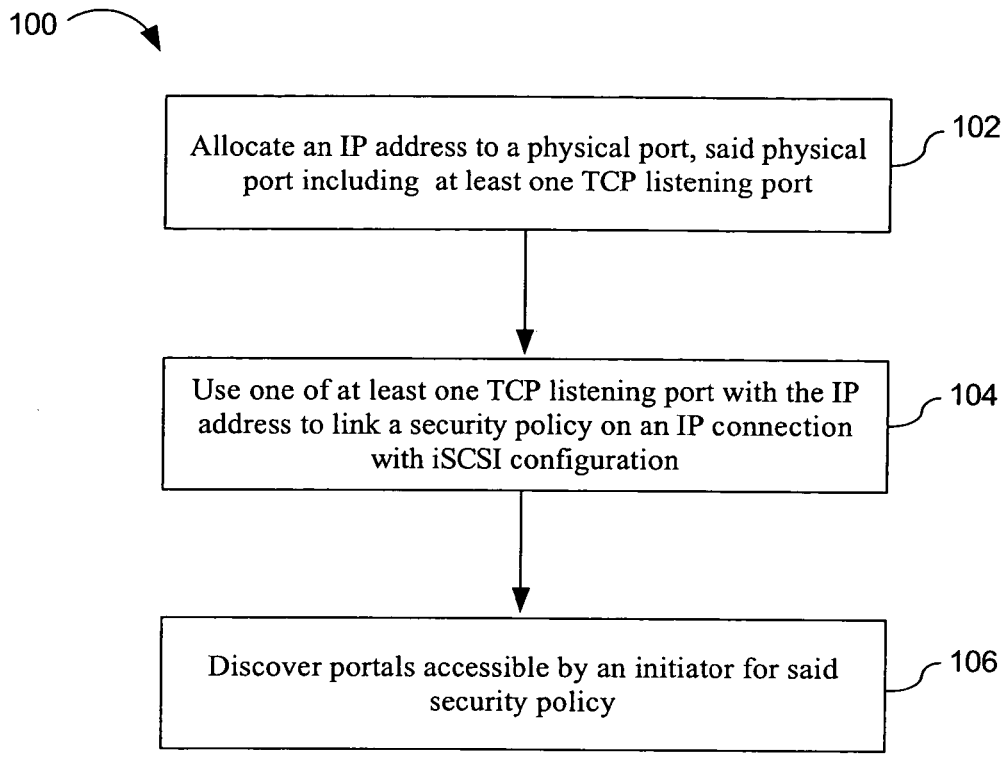
FIG. 1 is a flowchart showing an exemplary method for identifying IPsec security policy in iSCSI in accordance with an exemplary embodiment of the present invention.
FIG. 4 shows an exemplary list of TCP listening ports to IP security level mapping in accordance with an exemplary embodiment of the present invention.

Reference will now be made in detail to the presently preferred embodiments of the invention, examples of which are illustrated in the accompanying drawings.

The present invention provides a method by which the security policy of the IP layer may be explicitly coupled with the iSCSI layer configuration to eliminate the need for chat between the two network layers and to simplify the security policy configuration of target iSCSI devices.

The present invention may allow the security policy to be defined entirely on the target with target specific attributes and may eliminate the need for a chat interface between layers in the network protocol stack. The present invention may allow the iSCSI layer to know the security policy of connections which comprise an iSCSI session without a chat interface between the IP and iSCSI networking layers. The definition of a security policy may be configured entirely on the iSCSI target to match the requirements of the initiator's security policy without the need to include any initiator specific information in the target configuration. By embedding the security policy identification into the iSCSI configuration of the target node, the portals to be accessed by the initiator for each security policy can be discovered by the initiator during discovery.

The iSCSI specification separates the network access function from the physical network port. This allows multiple network access functions to be placed on each physical network port. The iSCSI network access function is performed by an iSCSI portal. The iSCSI portal is an IP address and an associated listening TCP port.

An iSCSI node (which encapsulates a single SCSI resource and is identified by a unique iSCSI name) may be associated with one or more iSCSI portals. An iSCSI portal forms the end point (initiator or target) of an iSCSI connection. A group of iSCSI portals whose connections can be combined into a single iSCSI session is defined as an iSCSI portal group. The iSCSI portal groups may indicate the capability of the target (or initiator) to span sessions across iSCSI portals.

The iSCSI standard requires that all storage resources accessed by a session be identical across all connections in the session. When IP security is added to the connections of an iSCSI session, all connections should have the same security policy so that all logical units being accessed with a given security policy can be seen by all connections in the session. Based on this requirement, the security policy on the IP connections may be considered an attribute of the iSCSI session and all portals in the session's portal group.

The security policy applied to an iSCSI connection may be identified by one of following four connection attributes in the IP security processor: the transport protocol, the initiator IP address, the target IP address, and the transport protocol listening port. For iSCSI, the only currently supported transport protocol is TCP so the transport protocol is not a viable attribute for identifying a connection's security policy. Using the initiator IP address would require that the target's security policy database be configured with possibly dynamic (via DHCP or BOOTP) IP addresses of the initiator and that each initiator have a unique IP address for each security policy used to access the target. This may place an unnecessary cross configuration requirement on both initiators and targets and may use multiple IP addresses which are a scarce resource. Using the target IP address to identify connection security policy requires only additional configuration on the target, because the initiator may discover all portals on an iSCSI network entity with which the initiator may interface using any of the iSCSI discovery mechanisms. However, using the target IP address may still consume multiple IP addresses which are a scarce resource. This leaves the transport protocol listening port as the only candidate for identifying the connection security policy. For iSCSI this is the TCP listening port used in the iSCSI portal definition. Using the TCP listening port does not unnecessarily consume limited IP addresses on either the target or initiator. Furthermore, using the TCP listening port does not require initiator and target cross configuration when any of the iSCSI discovery mechanisms are used by the initiator.

Referring to FIG. 1, an exemplary method or process 100 for identifying IPsec security policy in iSCSI in accordance with an exemplary embodiment of the present invention is shown. An IP address may be allocated to a physical port of an iSCSI network entity 102. The physical port may include at least one TCP listening port. For a discovery session, the IP address may be statically allocated (or permanently leased). For a normal session, the IP address may be statically allocated or DHCP assigned. One of the at least one TCP listening port with the IP address may then be used to link a security policy on an IP connection with iSCSI configuration 104. The portals to be accessed by an initiator for the security policy may then be discovered by the initiator during discovery 106.

Figure 2:
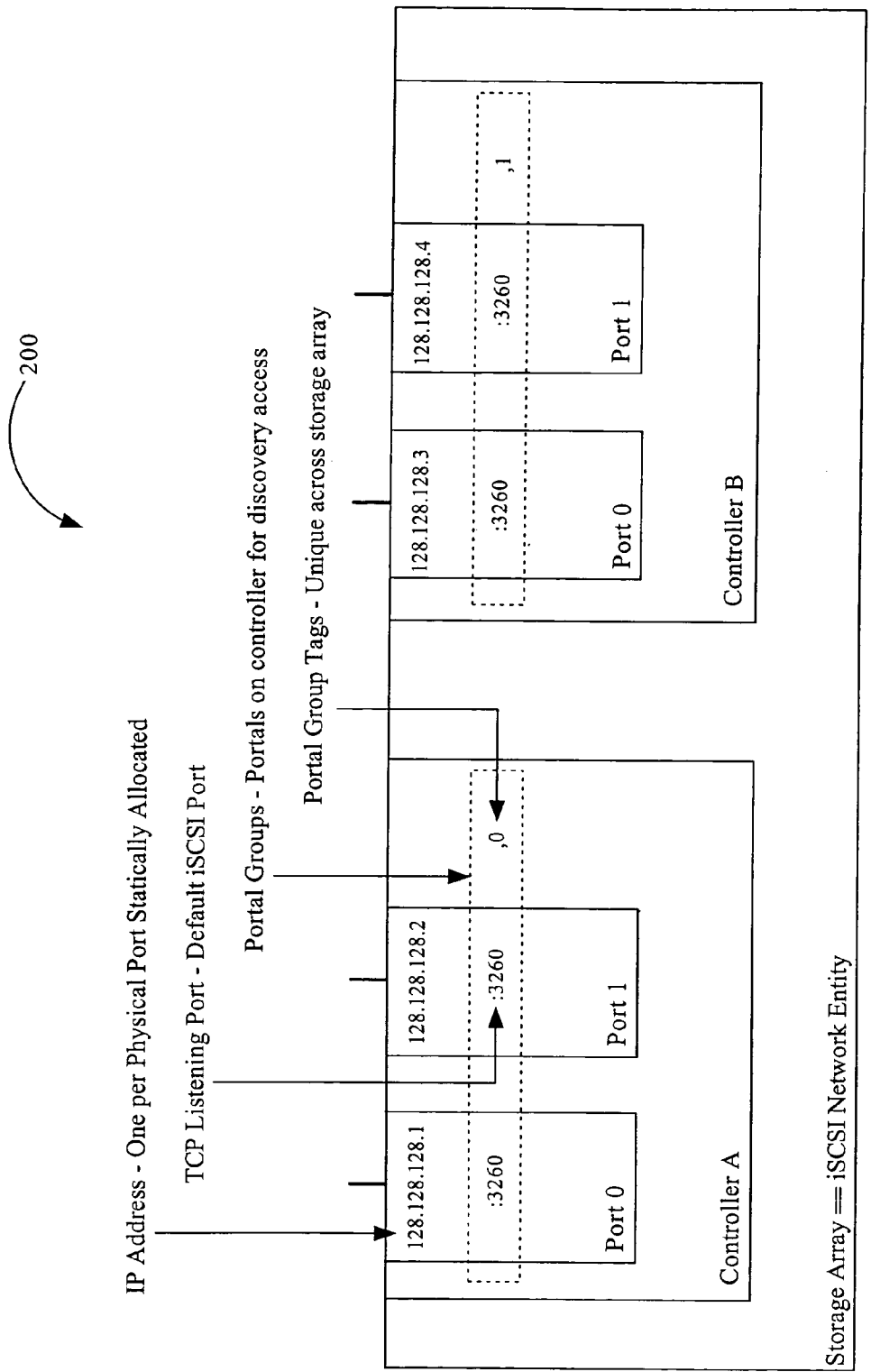
FIG. 2 shows an exemplary storage array portal and portal group organization in a discovery session in accordance with an exemplary embodiment of the present invention.
Figure 3:
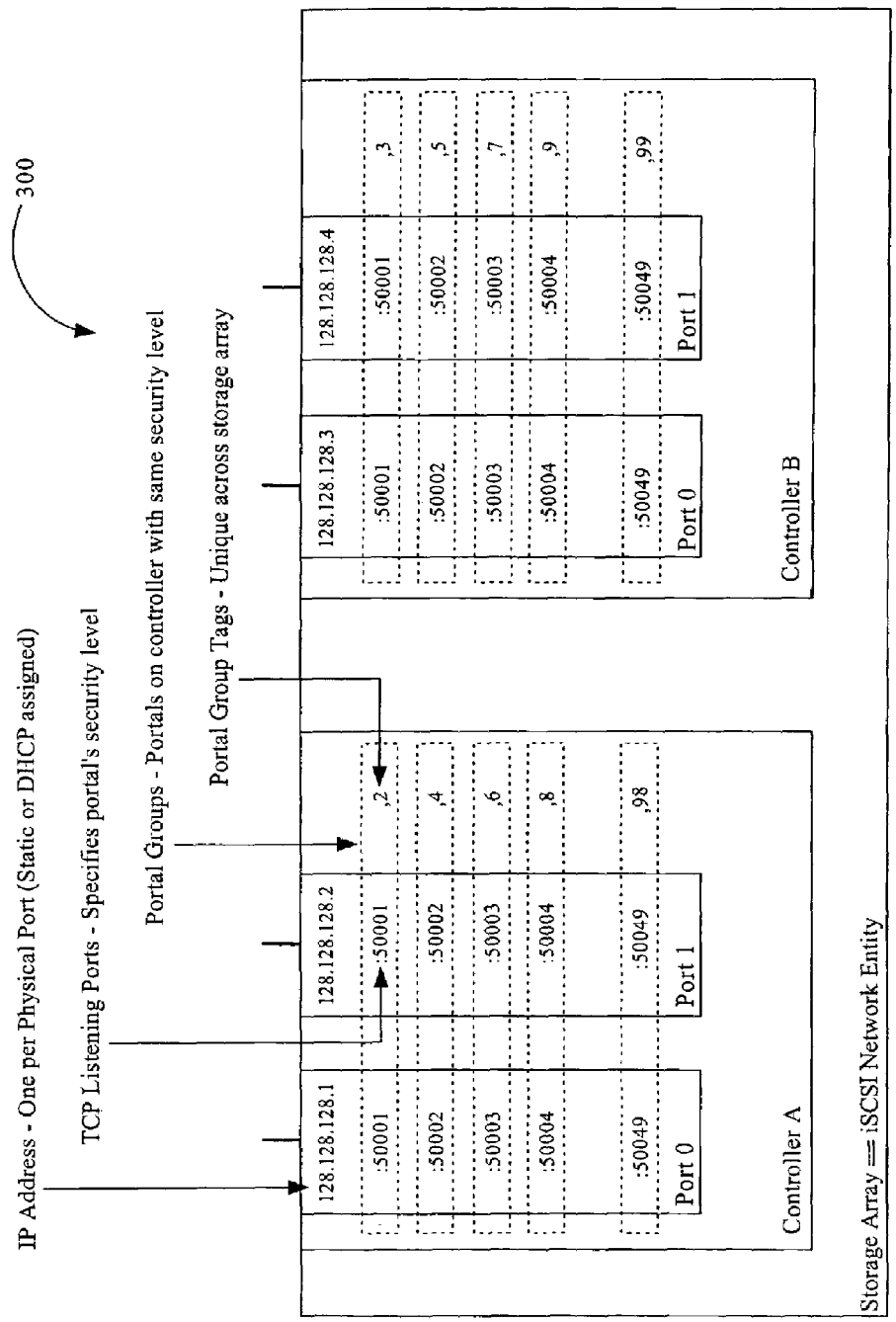
FIG. 3 shows an exemplary storage array portal and portal group organization in a normal session in accordance with an exemplary embodiment of the present invention.

FIGS. 2 and 3 show exemplary organizations of separate security level specific portals and portal groups in a dual controller iSCSI network entity in accordance with an exemplary embodiment of the present invention, where FIG. 2 shows portals used for a discovery session and FIG. 3 shows portals used for a normal session. The method 100 shown in FIG. 1 may be implemented in the iSCSI network entities 200 and 300 shown in FIGS. 2 and 3, respectively. As shown in FIG. 2, the portals and portal groups used for discovery are given a statically allocated (or permanently leased) IP address and use the default iSCSI TCP listening port 3260. As shown in FIG. 3, the portals and portal groups used for normal sessions may use the same statically assigned IP address or a dynamically allocated IP address. The normal session portals are assigned TCP listening ports that identify the security policy used on connections opened on the portals as shown in FIG. 4. Thus, according to the present invention, the TCP listening port may become an additional attribute used to define portal groups so all portals in a portal group can have the same TCP listening port. This attribute may be used in addition to the physical and firmware attributes to combine portals into portal groups.

The use of separate TCP listening ports with a single IP address to link the security policy on the IP connection with the iSCSI configuration in accordance with the present invention may have the following advantages over other methods for linking the IP security settings between the iSCSI layer and the IP security layer of the network stack. First, using the TCP listening port to identify the IPsec security policy does not consume additional IP addresses on either the target or the initiator. Additionally, the IPsec security policy may be identified entirely using target specific information. Moreover, the present invention aims to identify the IP security level used on a connection. The end points of a connection are the iSCSI portals, and each portal has as part of its definition the TCP listening port. The TCP listening port of the portal may specify a specific IP security level according to the method 100 shown in FIG. 1 and the list shown in FIG. 4. As a result, the security level of the connection (and by inference the iSCSI session) may be determined by information held entirely in the iSCSI configuration as long as the IP security level is indexed and configured using the TCP listening port. Furthermore, there is no need to implement a chat interface between the iSCSI and IP layers in the network stack Moreover, iSCSI targets may be defined for specific security levels using the security level specific portal groups.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for identifying a security policy in iSCSI, comprising:
    allocating an IP address to a physical port of a iSCSI network entity, said physical port including at least one TCP listening port; and
    using one of said at least one TCP listening port with said IP address to link a security policy on an IP connection with iSCSI configuration, thereby enabling a definition of the security policy to be configured entirely on an iSCSI target to match requirements of an initiator's security policy without the need to include any initiator specific information in the target configuration.

2. The method of claim 1, wherein in a discovery session said IP address is either statically allocated or permanently leased.

3. The method of claim 2, wherein said at least one TCP listening port is a default iSCSI TCP listening port 3260.

4. The method of claim 1, wherein in a normal session said IP address is either statically allocated or DHCP assigned.

5. The method of claim 1, further comprising discovering portals accessible by an initiator for said security policy.

6. A hardware apparatus for identifying a security policy in iSCSI, comprising:
    (a) means for allocating an IP address to a physical port of a iSCSI network entity, said physical port including at least one TCP listening port; and
    (b) means for using one of said at least one TCP listening port with said IP address to link a security policy on an IP connection with iSCSI configuration, thereby enabling a definition of the security policy to be configured entirely on an iSCSI target to match requirements of an initiator's security policy without the need to include any initiator specific information in the target configuration.

7. The apparatus of claim 6, wherein in a discovery session said IP address is either statically allocated or permanently leased.

8. The apparatus of claim 7, wherein said at least one TCP listening port is a default iSCSI TOP listening port 3260.

9. The apparatus of claim 6, wherein in a normal session said IP address is either statically allocated or DHCP assigned.

10. The apparatus of claim 6, further comprising means for discovering portals accessible by an initiator for said security policy.

11. A computer-readable storage medium having computer-executable instructions for performing a method for identifying a security policy in iSCSI, said method comprising:
    allocating an IP address to a physical port of a iSCSI network entity, said physical port including at least one TCP listening port; and
    using one of said at least one TCP listening port with said IP address to link a security policy on an IP connection with iSCSI configuration, thereby enabling a definition of the security policy to be configured entirely on an iSCSI target to match requirements of an initiator's security policy without the need to include any initiator specific information in the target configuration.

12. The computer-readable medium of claim 11, wherein in a discovery session said IP address is either statically allocated or permanently leased.

13. The computer-readable medium of claim 12, wherein said at least one TCP listening port is a default iSCSI TOP listening port 3260.

14. The computer-readable medium of claim 11, wherein in a normal session said IP address is either statically allocated or DHCP assigned.

15. The computer-readable medium of claim 11, wherein said method further comprising discovering portals accessible by an initiator for said security policy.

16. An iSCSI network entity, comprising:
    an iSCSI controller; and
    a plurality of physical ports in said iSCSI controller, each of said a plurality of physical ports having an IP address and including at least one TCP listening port,
    wherein said at least one TCP listening port identifies at least one security policy used on a connection opened on said at least one TCP listening port, thereby enabling a definition of the security policy to be configured entirely on an iSCSI target to match requirements of an initiator's security policy without the need to include any initiator specific information in the target configuration.

17. The iSCSI network entity of claim 16, wherein all TCP listening ports in said iSCSI controller forms at least one iSCSI portal group, and for each of said at least one security policy, there is one of said at least one iSCSI portal group including iSCSI portals having said each of said at least one security policy.

18. The iSCSI network entity of claim 17, wherein each portal group of said at least one portal group has a portal group tag unique across said iSCSI network entity.

19. The iSCSI network entity of claim 16, wherein in a discovery session said at least one TCP listening port is a default iSCSI TCP listening port 3260.

* * * * *